June 3, 1924.

S. L. MARSH

OIL PURIFIER

Filed Dec. 2, 1919

Inventor
Samuel L. Marsh
By his Attorney
Arthur Middleton

June 3, 1924.
S. L. MARSH
OIL PURIFIER
Filed Dec. 2, 1919
2 Sheets-Sheet 2
1,496,160
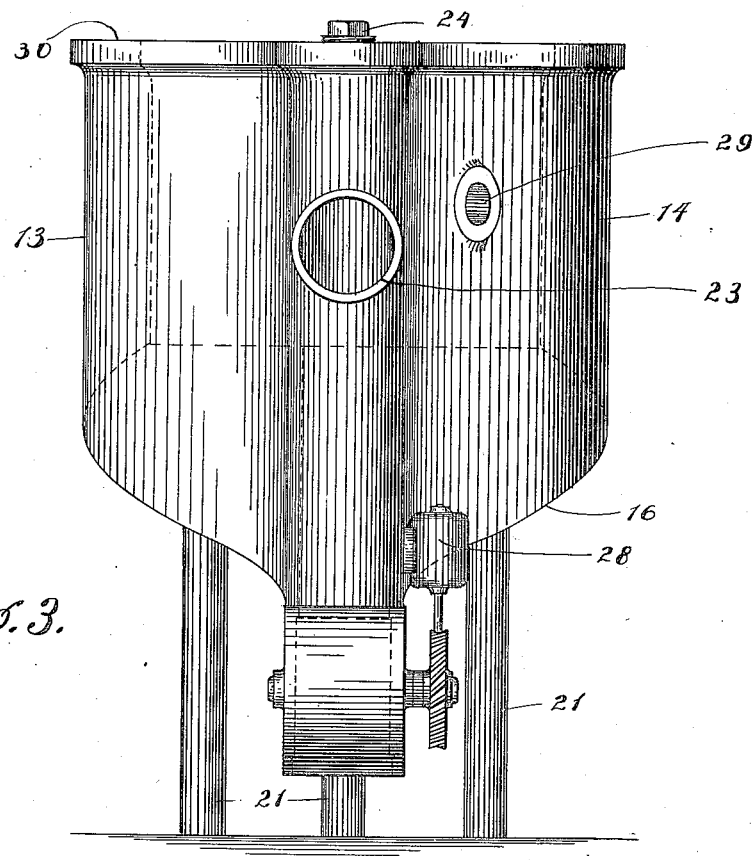
Fig. 3.
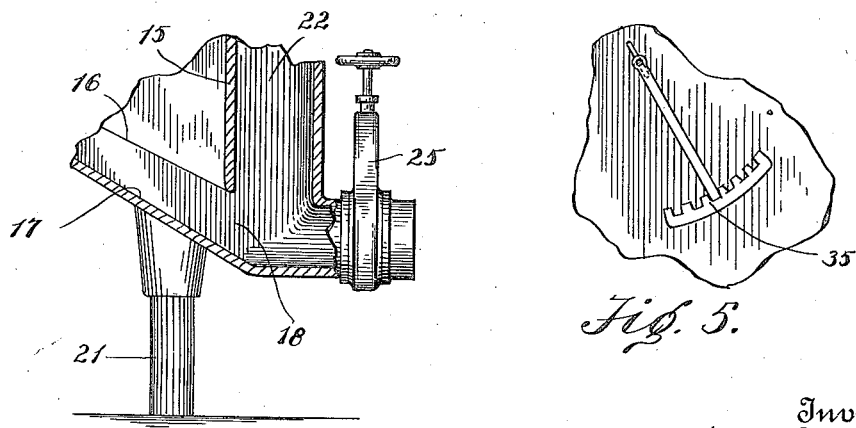
Fig. 4.
Fig. 5.
Inventor
Samuel L. Marsh
By his Attorney
Arthur Middleton Patented June 3, 1924.

1,496,160

UNITED STATES PATENT OFFICE.

SAMUEL L. MARSH, OF NEW YORK, N. Y.

OIL PURIFIER.

Application filed December 2, 1919. Serial No. 341,852.

*To all whom it may concern:*

Be it known that I, SAMUEL L. MARSH, a citizen of the United States of America, residing at New York, N. Y., have invented new and useful Improvements in Oil Purifiers, of which the following is a specification.

This invention relates to the preliminary purification or cleansing of oil in its natural state as it comes from wells or is in sumps, tanks, streams or pipe lines and its object is to remove from the oil its impurities of water and sand by means of a continuously operating process and apparatus.

The invention consists essentially in starting with the oil in its impure state, disturbing the equilibrium of the mixture by causing it to impact against baffle plates or deflectors of varied inclination whereby separation without emulsification of the various components of the mixture having different specific gravities is begun; passing the disturbed mixture while producing eddies or turbulence therein beneath a relatively large body of quiescent oil wherein the oil of the incoming mixture will rise into the body of the oil; facilitating this passage by having parts of the mixture uniformly accelerated in a downward direction; controlling the removal of the impurities remaining below the quiescent oil away therefrom; separating the liquid impurities from the solid preferably by siphonic action; and removing the solid impurities from the siphonic inlet. An overflow is provided for the purified oil to carry it away as fast as it accumulates above the predetermined level of the quiescent oil body.

The operation of the device of this invention is continuous in that the impure oil is always flowing in, being purified, with the purified oil leaving the purifying apparatus from one place and the impurities from another. Besides being continuous, the device is automatic so practically no labor is necessary. This permits the purifiers to be used in substantially any size although I prefer a battery of relatively small ones and they are adapted to have the oil, on its way from the well, in the pipe line, or in streams, flow through the purifiers.

Oil from wells in some localities contains water emulsified therein besides water therein as such. In such cases de-emulsifying apparatus or dehydraters are used in addition to the settling tanks. Such devices can be used in connection with my purifiers or they may be placed or operated within my purifiers.

The invention is illustrated in the accompanying drawings in which:

Fig. 3 shows an outlet end view.

Fig. 4 shows a detail of a modified form of sand valve.

Fig. 5 shows the baffles or deflectors to be adjustable.

Figure 1:
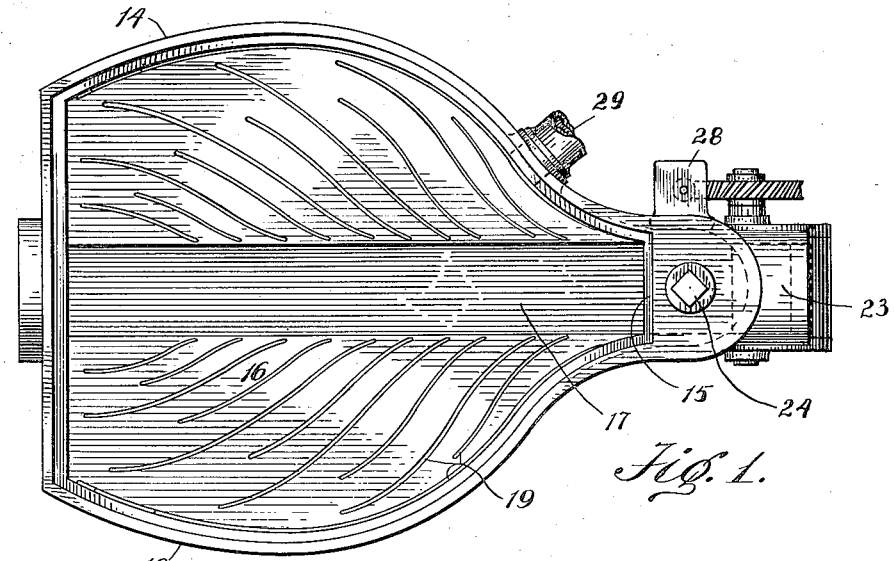
Figure 1 shows a plan view of one of my purifiers with the top removed.

In the drawings, the numeral 11 represents a preferably pear-shaped casing of varying width and depth having an inlet 12, curved side walls 13 and 14, an end wall 15, and an inclined bottom 16. The bottom 16 is provided with a false bottom 17 or central channel of varying depth, varying from nothing at the upper end to several inches in depth at the outlet 18 from the casing. 19 represents curved ribs on the bottom 16 of the casing leading to the channel 17 and 20 represents curved ribs on the side walls 13 and 14 leading downwardly to the outlet 18. 21, 21 represent supporting legs for the casing.

Figure 2:
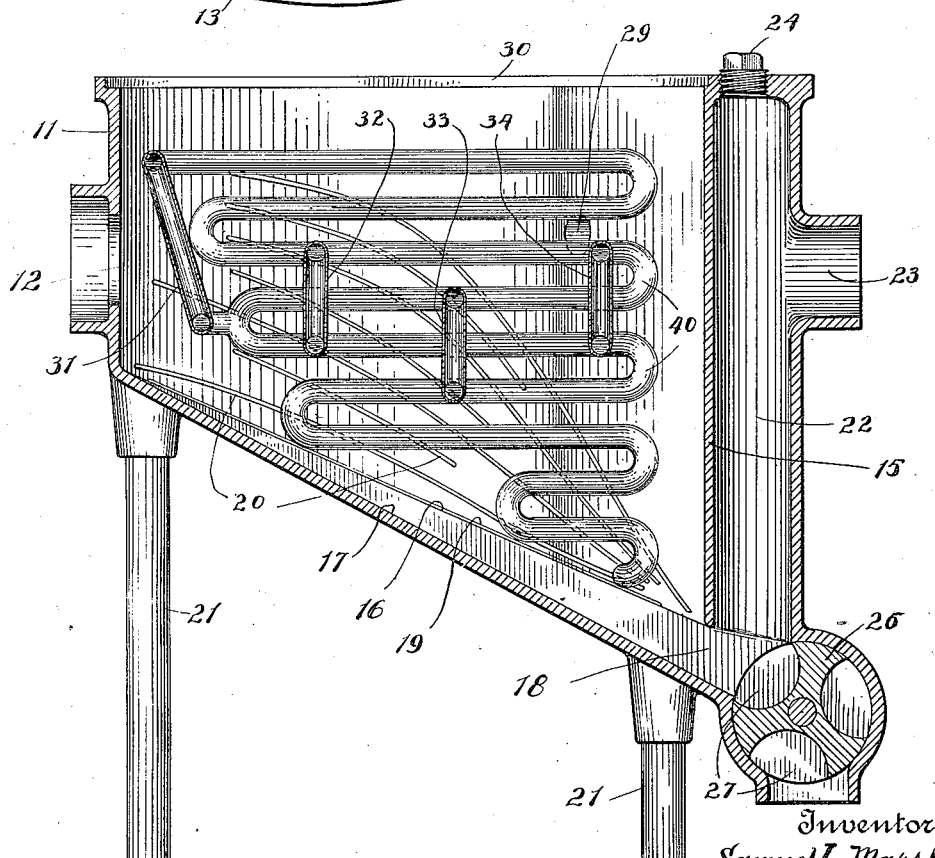
Fig. 2 shows a vertical section of the device with a dehydrater (such as steam coils) placed therein.

The outlet 18 is provided with a siphon or suction chamber 22 having an outlet 23 whose axial plane is slightly lower than that of the inlet 12. At the upper part of the siphon 22 is a cleaning plug 24 and at the lower part is a valve or conveyor for conveying away the sand. This may be in the form of a hand operated valve 25 as shown in Fig. 4 or it may be automatic as shown in Fig. 2 wherein a rotor 26 provided with pockets 27 conveys the sand away from the siphon. This rotor may be rotated by any suitable means such as a motor 28 or a steam engine, or from a fluid turbine operated from the oil flowing to the purifier. 29 indicates the purified oil overflow pipe. 30 represents the top for the casing 11.

31 represents an inclined deflector placed near the inlet 12 and directed downwardly. 32, 33, 34 represent additional deflectors, all of which may be adjusted either angularly or horizontally by any desired means as for example the way shown in Fig. 5 as at 35.

Any dehydrating devices may be used in connection with this purifier and steam-coils 40 in Fig. 2 show one method as an example.

In operation, the oil in an impure state as it comes from a well, sump, or pipe line, flows through the inlet 12 under pressure or gravity into the purifier which is maintained full of liquid up to the dotted line indicating the liquid level thereof. The oil comes in contact with the deflector 31, which, because of its inclination obliquely to the direction of oil flow abruptly changes the direction of flow of the mixture without emulsification. This change of direction disturbs the equilibrium of the components of the oil mixture whereupon as shown by the arrows, the oil particles force their way upwardly whereas the water and sand impurities pass down the incline of the bottom of the purifier. This is duplicated but to a lesser degree by each of the succeeding deflectors although the necessity for guarding against the emulsification of the oil with its impurities is not so great in the subsequent deflectors for the momentum of the oil is very much lessened by the first deflector. Emulsification has to be guarded against because if it does take place, means other than this purifier are necessary to bring about de-emulsification.

Due to the peculiar construction and inclination of the false bottom or channel 17 of increasing depth, the water impurities of the oil mixture, flow downwardly at an accelerated speed so that by the time the water has passed the outlet 18 and reached the bottom of the chamber 22, it has gathered momentum enough to carry it up and out the outlet 23. Moreover, the outlet 23, being connected to a pipe leading to a sewer below the purifier, there is a certain suction or siphonic action thereby created in the chamber 22.

Therefore, the depressed channel 17 causes a flow of water to the outlet 18 which is uniformly accelerated as it descends and this acceleration of the water and what sediment or solid impurities get into the downflow of water, tend to cause the solid impurities to bounce upwardly, as it were, after passing through the outlet 18 and into the suction or siphon tube 22. In other words, the sediment or solid impurities, after reaching the bottom of the tube 22, due to this bouncing are kept in violent agitation which permits the suction to act upon them to carry the lighter ones over the outlet pipe 23.

However, I find I must control or retard the egress of the solid impurities through the outlet 18 or else they will tend to all move at once with the resulting blocking or clogging of the outlet 18. This control of the solid impurities to retard their movement is embodied in the ribs 19 and 20 because in settling, the sediment collects between adjacent ribs whereby reservoirs are formed which hold the sediment to let it go gradually into the downflow in the channel 17 and through the outlet 18. This control and retardation of the heavy sediment is an important feature of my invention because it prevents it from passing to the outlet too rapidly which would cause clogging thereof and moreover, the ribs guide the sediment to the central channel where it is carried off due to the suction in said channel and at said outlet.

As has been explained a quiescent body of purified oil collects above the downflow of water and beneath this quiescent body, I desire to make the liquid therebelow turbulent or to produce eddies therein. The turbulence or eddies are produced by the impact of the mixture against the baffles, the curved side walls of the purifier, by the ribs 19 and 20 and the drag or suction or acceleration in the channel to the outlet. The turbulence or eddies not only further facilitate the separation and flotation of the oil particles upwardly into the quiescent body but apparently cleanse the oil particles from any impurities which tend to stick thereto. It may be said that the turbulence washes the lower boundary or layer of the quiescent mass and as successive layers are being constantly added to the mass from below, the entire oil mass therein goes through this cleansing action.

It may also be pointed out that the ribs retard and guide the sediment flow on the bottom of the basin to the central channel in proportion to the rapidity of flow and suction of the water through the channel and outlet; in other words, the sediment is evacuated in ratio to the volume of water passing through the device and by that means I prevent clogging of the machine. The sand or other solid impurities mixed with the water, being so much heavier, gradually accumulate in the siphon or suction tube 22 in which case they can be removed therefrom by means of the rotating conveyor or wheel 25 having pockets 27. Any suitable means may be used to handle the sand after its exit from the conveyor 25.

As the oil accumulates in the quiescent mass in the upper part of the casing it overflows by force or gravity through the overflow pipe outlet or discharge 29 to be conveyed where desired. The discharge outlet 29 is located above the bottom of the outlet 23 for if it were not, the liquid impurities would run out the discharge instead of the outlet 23.

I do not limit myself to the number of oil overflows 29 or baffles 32, 33, etc.

It will thus be seen that I have devised a very simple apparatus for removing the impurities from oil as it comes from wells, sumps, garages, and the like, wherein the oil can be purified continuously and efficiently with no danger whatever of the purifier clogging.

What I claim is:—

1. A method of continuously purifying oil which consists in disturbing the equilibrium of the mixture without emulsification by obliquely changing the direction of flow of at least a part of the mixture whereby separation of its various impurities having different specific gravities is begun, passing causing turbulence in the disturbed mixture beneath a relatively large body of quiescent oil wherein the oil of the incoming mixture will rise into the body of the oil, conducting the remaining impurities away from the body of oil and continuously removing the purified oil.

2. The method of claim 1 with the addition of separating the liquid impurities from the solid by suction in a suction chamber, and automatically removing the accumulations of solid impurities from the suction chamber.

3. In a purifier for oil having a substantially pear-shaped basin provided with curved side walls, an inlet, and an outlet, means provided in said basin for retarding the flow of solid impurities of the oil during their passage to said outlet, and an oil discharge above the bottom of said outlet for continuously removing the purified oil from the basin.

4. In a device of the character described, a basin, an inlet and outlet therefor, the walls of said basin being convergent from the inlet to the outlet and curved whereby turbulence is caused in the liquid flowing through the basin, and a channel in the bottom wall of the basin, said channel extending from one end of the basin to the other, the depth of the channel increasing gradually from the inlet to the outlet end, and discharge means located above the bottom of the outlet for continuously removing the purified oil from the basin.

5. In a device of the character described, a basin, an inlet and an outlet therefor, a channel in the bottom wall of the basin, said channel extending from one end of the basin to the other, the depth of the channel increasing gradually from the inlet to the outlet end, and ribs provided on the walls of said basin to guide the sediment into the channel so as to cause sufficient retardation thereof to prevent the sediment from clogging the outlet end of the channel, and discharge means for continuously removing the purified oil from the basin.

6. In a device of the character described, a basin, an inlet and outlet therefor, said basin having curved side walls converging from said inlet to said outlet and having a bottom wall sloping downwardly from said inlet to said outlet, a channel in said bottom extending from one end of the basin to the other end having gradually increasing depth from the inlet to the outlet end, ribs on the side and bottom walls of said basin converging toward the outlet end of said channel to guide and control the flow of sediment thereinto, a substantially vertical channel communicating with said outlet, and discharge means for continuously removing the purified oil from said basin.

7. In a device of the character described, a substantially pear-shaped basin having a sloping bottom wall and curved side walls, an inlet at said one end of the basin, an outlet channel at said other end thereof, said channel having a discharge opening at approximately the same level as that of the said inlet, and having an entrance end in free communication with the lowermost portion of said basin, and guide members in the walls of said basin for guiding liquid and sediment to the entrance end of said channel, and discharge means for removing the purified oil.

8. A device of the class described having a basin, an inlet and outlet therefor, the walls of said basin being convergent to said outlet and the bottom of said basin being inclined, baffles in said basin for operating upon the liquid flowing into said basin to separate the particles thereof having different specific gravities, and adjustable means for changing the degree of inclination of said baffles with respect to the inflowing liquid.

In testimony whereof, I have signed my name to this specification this 12th day of November, 1919.

SAMUEL L. MARSH.